United States Patent
Koshizen

(10) Patent No.: US 12,094,216 B2
(45) Date of Patent: Sep. 17, 2024

(54) TRAFFIC MONITORING SYSTEM, TRAFFIC MONITORING METHOD, AND STORAGE MEDIUM

(71) Applicant: HONDA MOTOR CO., LTD., Tokyo (JP)

(72) Inventor: Takamasa Koshizen, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 357 days.

(21) Appl. No.: 17/560,433

(22) Filed: Dec. 23, 2021

(65) Prior Publication Data
US 2022/0207880 A1    Jun. 30, 2022

(30) Foreign Application Priority Data

Dec. 28, 2020    (JP) ................................. 2020-219495
Jun. 3, 2021     (JP) ................................. 2021-093620

(51) Int. Cl.
  *G06V 20/58*    (2022.01)
  *B60W 40/04*    (2006.01)
  (Continued)

(52) U.S. Cl.
  CPC .............. *G06V 20/58* (2022.01); *B60W 40/04* (2013.01); *B60W 50/0097* (2013.01); *G06T 7/70* (2017.01);
  (Continued)

(58) Field of Classification Search
  CPC ....... G06V 20/58; G06V 20/54; B60W 40/04; B60W 50/0097; B60W 2554/4026;
  (Continued)

(56) References Cited

U.S. PATENT DOCUMENTS 9,511,767 B1 *  12/2016  Okumura .............. B60W 40/04
10,783,789 B2   9/2020  Mizutani
(Continued)

FOREIGN PATENT DOCUMENTS

CN    107945536    4/2018
CN    108534792    9/2018
(Continued)

OTHER PUBLICATIONS

T. Koshizen et al ("Predicting motorcycle riding behavior using vehicle density variation," 2021 IEEE Intelligent Vehicles Symposium Workshops (IV Workshops), Nagoya, Japan, 2021, pp. 114-121, doi: 10.1109/IVWorkshops54471.2021.9669216.) (Year: 2021).*
(Continued)

*Primary Examiner* — Edward F Urban
*Assistant Examiner* — Wassim Mahrouka
(74) *Attorney, Agent, or Firm* — Amin, Turocy & Watson, LLP

(57) ABSTRACT

A traffic monitoring system includes a storage device that stores a program and a hardware processor, in which the hardware processor executes a program stored in the storage device, thereby acquiring a position of a mobile object based on information from a detection device for detecting the position of the mobile object, generating information on a density distribution in which index values having a distribution according to the position of the mobile object are superimposed on one another for a plurality of mobile objects, and predicting whether a target mobile object is likely to enter a gap between two of the mobile objects based on a temporal change in density value indicated by the information on a density distribution.

12 Claims, 10 Drawing Sheets

(51) Int. Cl.
  *B60W 50/00* (2006.01)
  *G06T 7/70* (2017.01)
(52) U.S. Cl.
  CPC .............. *B60W 2554/4026* (2020.02); *B60W 2554/4041* (2020.02); *B60W 2554/4045* (2020.02); *B60W 2554/406* (2020.02); *G06T 2207/30236* (2013.01)
(58) Field of Classification Search
  CPC . B60W 2554/4041; B60W 2554/4045; B60W 2554/406; G06T 7/70; G06T 7/246; G06T 2207/30236; G06T 2207/10016; G06T 2207/30241; G06T 2207/30248; G08G 1/0129; G08G 1/0137; G08G 1/052
  See application file for complete search history.

(56) References Cited

U.S. PATENT DOCUMENTS

| | | | |
|---|---|---|---|
| 2018/0253975 A1* | 9/2018 | Mizutani | G08G 1/167 |
| 2019/0061749 A1 | 2/2019 | Fukumoto et al. | |
| 2019/0149747 A1* | 5/2019 | Keskikangas | G06T 7/11 |
| | | | 348/36 |
| 2020/0122737 A1 | 4/2020 | Mcgill | |
| 2020/0327809 A1 | 10/2020 | Ji et al. | |
| 2021/0221368 A1* | 7/2021 | Lavi | B60K 35/00 |
| 2022/0144273 A1* | 5/2022 | Yamaguchi | B60W 60/00276 |
| 2023/0339494 A1* | 10/2023 | Hack | B62J 50/21 |

FOREIGN PATENT DOCUMENTS

| | | |
|---|---|---|
| CN | 108885835 | 11/2018 |
| CN | 111791885 | 10/2020 |
| JP | 2015-118555 | 6/2015 |
| JP | 2015-230676 | 12/2015 |
| JP | 2015-230678 | 12/2015 |
| JP | 2020-180870 | 11/2020 |
| WO | 2019/155880 | 8/2019 |
| WO | 2019/239402 | 12/2019 |

OTHER PUBLICATIONS

Rahul Nair et al., "A porous flow approach to modeling heterogeneous traffic in disordered systems", Procedia Social and Behavioral Sciences 17 (2011) 611-627.
Chinese Office Action for Chinese Patent Application No. 202111584498.7 mailed May 28, 2023.
Japanese Office Action for Japanese Patent Application No. 2021-093620 mailed May 7, 2024.

* cited by examiner

COORDINATE CONVERSION

TRAFFIC MONITORING SYSTEM, TRAFFIC MONITORING METHOD, AND STORAGE MEDIUM

CROSS-REFERENCE TO RELATED APPLICATIONS

Priority is claimed on Japanese Patent Application No. 2020-219495, filed Dec. 28, 2020, and Japanese Patent Application No. 2021-093620, filed Jun. 3, 2021, the content of both of which is incorporated herein by reference.

BACKGROUND

Field of the Invention

The present invention relates to a traffic monitoring system, a traffic monitoring method, and a storage medium.

Description of Related Art

A technology for predicting a traffic volume in a mixed traffic scene of four-wheeled vehicles and two-wheeled vehicles is disclosed (for example, refer to "A porous flow approach to modeling heterogeneous traffic in disordered systems," Rahul Nair, Hani S. Mahmassani, Elise Miller-Hooks, Procedia Social and Behavioral Sciences 17 (2011) 611-627).

SUMMARY

In conventional technologies, it may not be possible to accurately predict whether a target mobile object such as a two-wheeled vehicle will enter between mobile objects.

The present invention has been made in consideration of such circumstances, and an object thereof is to provide a traffic monitoring system, a traffic monitoring method, and a program capable of accurately predicting whether a target mobile object will enter between mobile objects.

The traffic monitoring system, the traffic monitoring method, and the storage medium according to the present invention have adopted the following configuration.

(1): A traffic monitoring system according to one aspect of the present invention includes a storage device that stores a program and a hardware processor, in which the hardware processor executes a program stored in the storage device, thereby acquiring a position of a mobile object based on information from a detection device for detecting the position of the mobile object, generating information on a density distribution in which index values having a distribution according to the position of the mobile object are superimposed on one another for a plurality of mobile objects, and predicting whether a target mobile object is likely to enter a gap between two of the mobile objects based on a temporal change in density value indicated by the information on a density distribution.

(2): In the aspect of (1) described above, the target mobile object is a two-wheeled vehicle.

(3): In the aspect of (1) described above, the hardware processor generates the information on a density distribution on a virtual plane in a bird's-eye view.

(4): In the aspect of (1) described above, when a density value of a gap between two of the mobile objects is equal to or more than a first reference value and the density value tends to decrease, the hardware processor predicts that the target mobile object is likely to enter the gap.

(5): In the aspect of (1) described above, when a density value of a gap between two of the mobile objects is equal to or more than a first reference value, the density value does not tend to decrease, and relative speeds of two of the mobile objects with respect to the target mobile object increase, the hardware processor predicts that the target mobile object is likely to enter the gap.

(6): In the aspect of (1) described above, when a length of a gap between two of the mobile objects is less than a threshold value, the hardware processor predicts that the target mobile object is not likely to enter the gap.

(7): In the aspect of (1) described above, the hardware processor estimates a trajectory and acceleration at a time when the target mobile object passes through the gap based on a gradient of the density value.

(8): In the aspect of (1) described above, when there are a plurality of gap candidates within a search range on a traveling direction side of the target mobile object, the hardware processor derives a midpoint of each of the gap candidates, and extracts, as a gap to be predicted, a gap candidate whose azimuthal angle of the midpoint viewed from the target mobile object is closest to a traveling direction of the target mobile object.

(9): In the aspect of (1) described above, when there are a plurality of gap candidates within a search range on a traveling direction side of the target mobile object, the hardware processor predicts whether the target mobile object is likely to enter a gap in order from a gap candidate with a better score based on the density value.

(10): In the aspect of (1) described above, when there are a plurality of gap candidates within a search range on a traveling direction side of the target mobile object, the hardware processor predicts whether the target mobile object is likely to enter a gap in order from a gap candidate with a better score based on a length of the gap.

(11): A traffic monitoring method to be executed by a computer according to another aspect of the present invention includes acquiring a position of a mobile object based on information from a detection device for detecting the position of the mobile object, generating information on a density distribution in which index values having a distribution according to the position of the mobile object are superimposed on one another for a plurality of mobile objects, and predicting whether a target mobile object is likely to enter a gap between two of the mobile objects based on a temporal change of a density value indicated by the information on a density distribution.

(12): A storage medium according to still another aspect of the present invention stores a program that causes a computer to execute acquiring a position of a mobile object based on information from a detection device for detecting the position of the mobile object, generating information on a density distribution in which index values having a distribution according to the position of the mobile object are superimposed on one another for a plurality of mobile objects, and predicting whether a target mobile object is likely to enter a gap between two of the mobile objects based on a temporal change of a density value indicated by the information on a density distribution.

(13): A traffic monitoring system according to still another aspect of the present invention includes a storage device that stores a program, and a hardware processor, in which the hardware processor executes the program stored in the storage device, thereby acquiring a position of a mobile object based on information from a detection device for detecting the position of the mobile object, generating information on a density distribution in which index values having a distribution according to the position of the mobile object are superimposed on one another for a plurality of mobile objects, and predicting whether a target mobile object is likely to enter a gap between two of the mobile objects based on a temporal change of a density value indicated by the information on a density distribution.

(14): In the aspect of (13) described above, the target mobile object is a two-wheeled vehicle.

(15): In the aspect of (13) described above, the hardware processor generates the information on a density distribution on a virtual plane in a bird's-eye view.

(16): In the aspect of (13) described above, the hardware processor predicts that the target mobile object is likely to accelerate toward a gap between two of the mobile objects when a density value of the gap between two of the mobile objects is equal to or greater than a first reference value and the density value tends to decrease.

(17): In the aspect of (13) described above, the hardware processor predicts that the target mobile object is likely to accelerate toward a gap between two of the mobile objects when a density value of the gap between two of the mobile objects is equal to or greater than a first reference value, the density value does not tend to decrease, and relative speeds of two of the mobile objects with respect to the target mobile object increase.

(18): In the aspect of (13) described above, the hardware processor predicts that the target mobile object does not accelerate toward a gap between two of the mobile objects when a length of the gap between two of the mobile objects is less than a threshold value.

(19): In the aspect of (13) described above, the hardware processor estimates a trajectory and acceleration at a time when the target mobile object accelerates toward the gap based on a gradient of a density value.

(20): In the aspect of (13) described above, when there are a plurality of gap candidates in a search range on a traveling direction side of the target mobile object, the hardware processor derives a midpoint of each of the gap candidates, and extract a gap candidate whose azimuthal angle of the midpoint viewed from the target mobile object is closest to a traveling direction of the target mobile object as a gap to be predicted.

(21): In the aspect of (13) described above, when there are a plurality of gap candidates within a search range on a traveling direction side of the target mobile object, the hardware processor predicts whether the target mobile object is likely to accelerate toward a gap in order from a gap candidate with a better score based on the density value.

(22): In the aspect of (13) described above, when there are a plurality of gap candidates within a search range on a traveling direction side of the target mobile object, the hardware processor predicts whether the target mobile object is likely to accelerate toward a gap in order from a gap candidate with a better score based on a length of the gap.

According to the aspects of (1) to (11) described above, it is possible to accurately predict whether a target mobile object will enter a space between mobile objects.

According to the aspect of (6) described above, it is possible to predict a behavior of a target mobile object more accurately.

DESCRIPTION OF EMBODIMENTS

In the following description, embodiments of a traffic monitoring system, a traffic monitoring method, and a storage medium of the present invention will be described with reference to the drawings. The traffic monitoring system is realized by one or more processors. The traffic monitoring system may be realized by one device, or may be a set of a plurality of devices or programs. In the case of the latter, the traffic monitoring system includes, for example, an in-vehicle device or cloud server and an application program installed on a terminal device of a user. Hereinafter, this will be described as a representative example. In the following description, a vehicle is taken as a representative example of a mobile object, but the mobile object is not limited to a vehicle and may broadly include robots and other traffic participants. The same applies to a target mobile object.

First Embodiment

Figure 1:
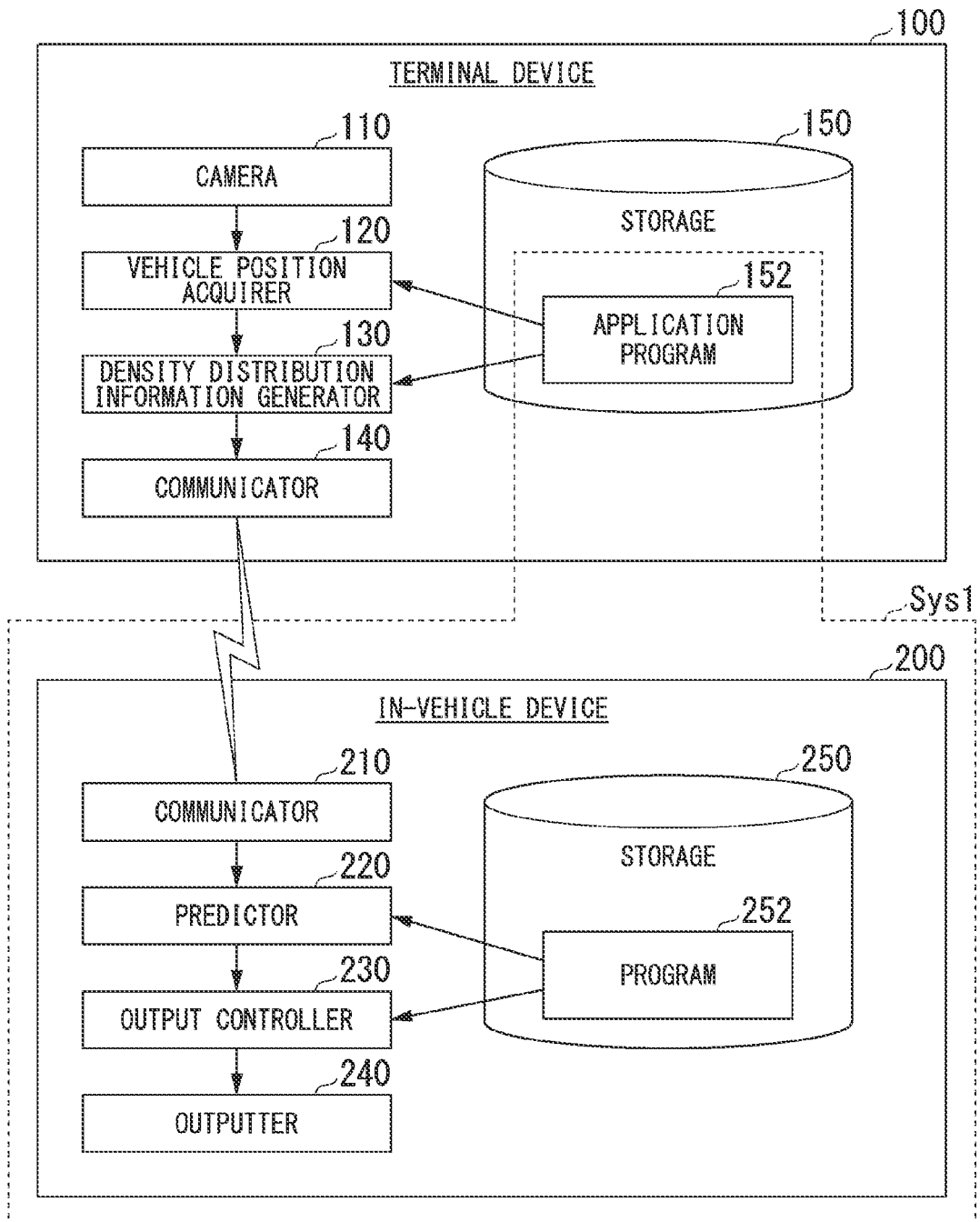
FIG. 1 is a diagram which shows an application example of a traffic monitoring system according to a first embodiment.

FIG. 1 is a diagram which shows an application example of a traffic monitoring system Sys1 according to a first embodiment. The traffic monitoring system Sys1 includes, for example, an application program 152 installed on a terminal device 100 and an in-vehicle device 200.

The terminal device 100 is, for example, a portable terminal device such as a smartphone. The terminal device 100 is used by being set in a holder provided on, for example, a vehicle compartment side of a front windshield or a vehicle compartment side of a rear windshield of a vehicle. In the following description, a vehicle in which the terminal device 100 is set and the in-vehicle device 200 is installed is referred to as a host vehicle. Vehicles within the scope of claims do not include, for example, the host vehicle. The terminal device 100 includes, for example, a camera 110, a vehicle position acquirer 120, a density distribution information generator 130, a communicator 140, and a storage 150.

The camera 110 is an embedded camera of the terminal device 100, and captures an image of a scenery of the outside world according to an instruction from the application program 152. The terminal device 100 is set in a holder as described above, and thereby the camera 110 captures the image of the scenery of the outside world of a host vehicle via the front windshield or the rear windshield. Since vehicles are present in the outside world of the host vehicle, the camera 110 is an example of a detection device for detecting the positions of the vehicles. As the detection device, in addition to the camera 110, a radar device, a light detection and ranging (LIDAR) device, a communication device, or the like may be used. When the detection device is a communication device, the communication device receives the position of a vehicle positioned in the vehicle according to communication.

Each of the vehicle position acquirer 120 and the density distribution information generator 130 functions when the application program 152 is executed by a processor such as a central processing unit (CPU). The vehicle position acquirer 120 acquires positions of vehicles based on information from the camera 110. The vehicles include four-wheeled vehicles and two-wheeled vehicles.

Figure 2:
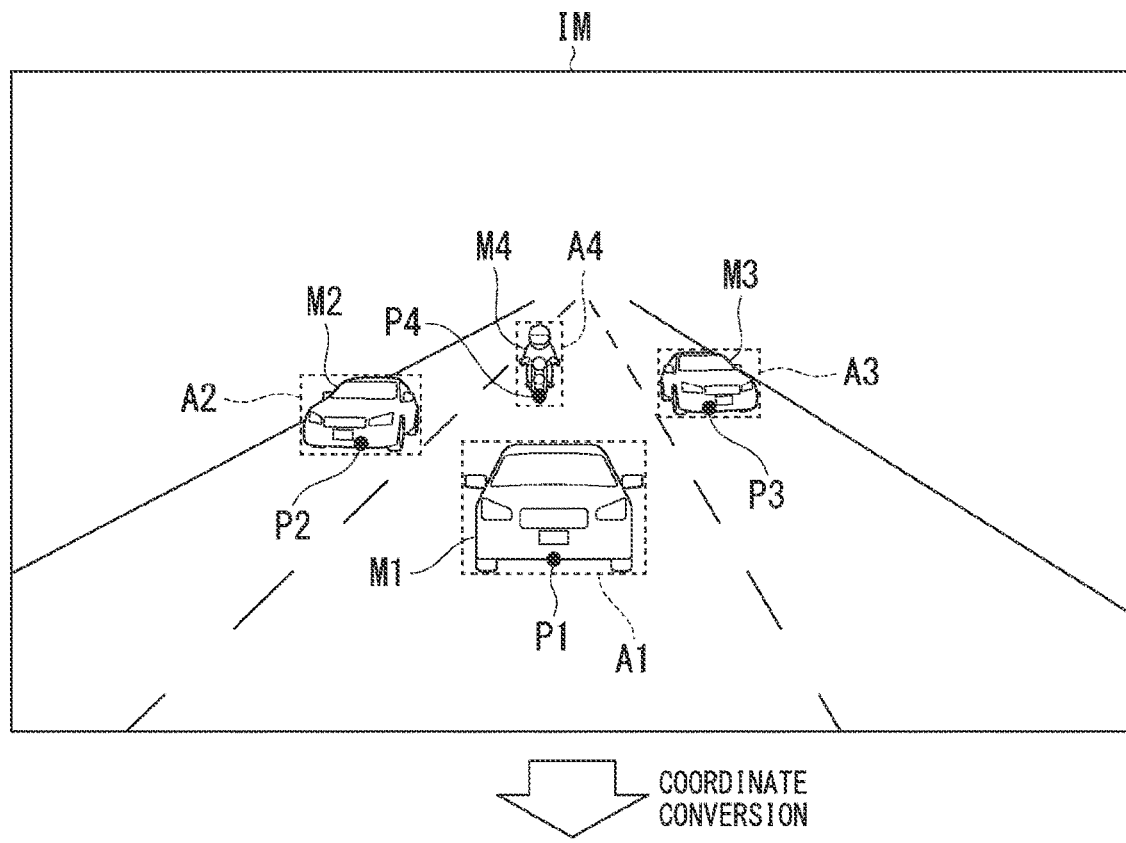
FIG. 2 is a diagram for describing processing of a vehicle position acquirer.
Figure 2:
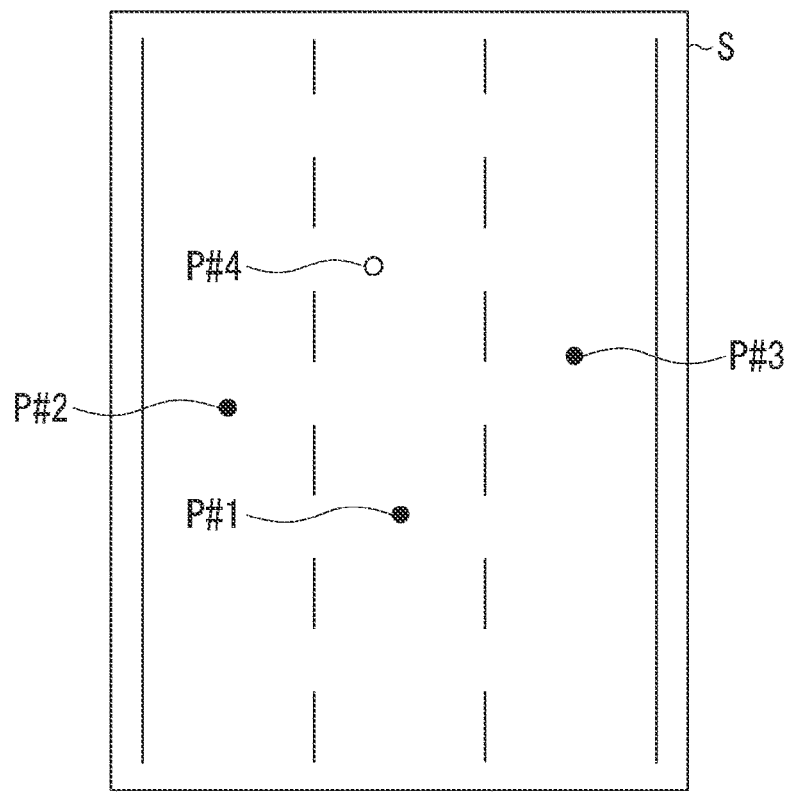

FIG. 2 is a diagram for describing processing of the vehicle position acquirer 120. The vehicle position acquirer 120 performs processing to be described below on each of a plurality of vehicles when the plurality of vehicles are shown in an image (a captured image IM) captured by the camera 110. FIG. 2 shows a case where the camera 110 captures an image of a rear of the host vehicle.

The vehicle position acquirer 120 first specifies an area occupied by a vehicle in the captured image IM. The vehicle position acquirer 120 specifies the area occupied by a vehicle, for example, using a learned model learned to output information that specifies the area described above when an image is input. A1 to A4 in FIG. 2 indicate areas occupied by each of vehicles M1 to M4, which are specified. In FIG. 2, M1 to M3 are four-wheeled vehicles, and M4 is a two-wheeled vehicle.

The vehicle position acquirer 120 specifies, for example, a position near a center of a lower end of a specified area as the position of a vehicle on an image plane of the captured image. P1 to P4 in FIG. 2 indicate respective positions of the vehicles M1 to M4.

Moreover, the vehicle position acquirer 120 converts the position of a vehicle on the image plane into the position of a vehicle on a virtual plane S. The virtual plane S is a virtual plane in a bird's-eye view and substantially coincides with a road plane. The vehicle position acquirer 120 specifies, for example, the position of a representative point of a vehicle in the virtual plane S based on a conversion rule of converting coordinates on the image plane to coordinates on the virtual plane, and passes it to the density distribution information generator 130. P #1 to P #4 in FIG. 2 indicate the positions of the vehicles M1 to M4 on the virtual plane S.

The density distribution information generator 130 sets an index value I having a distribution according to the position of a vehicle on the virtual plane S with reference to each of the positions of a plurality of vehicles acquired from the vehicle position acquirer 120. The index value I is set, for example, so that a contour line has a circular shape centered on the position of a vehicle. When the index value I is a height, the distribution of the index on the virtual plane S has a dome shape in which the position of a vehicle is a ceiling. The density distribution information generator 130 may or may not change a degree of density spread depending on a vehicle type of a vehicle.

Figure 3:
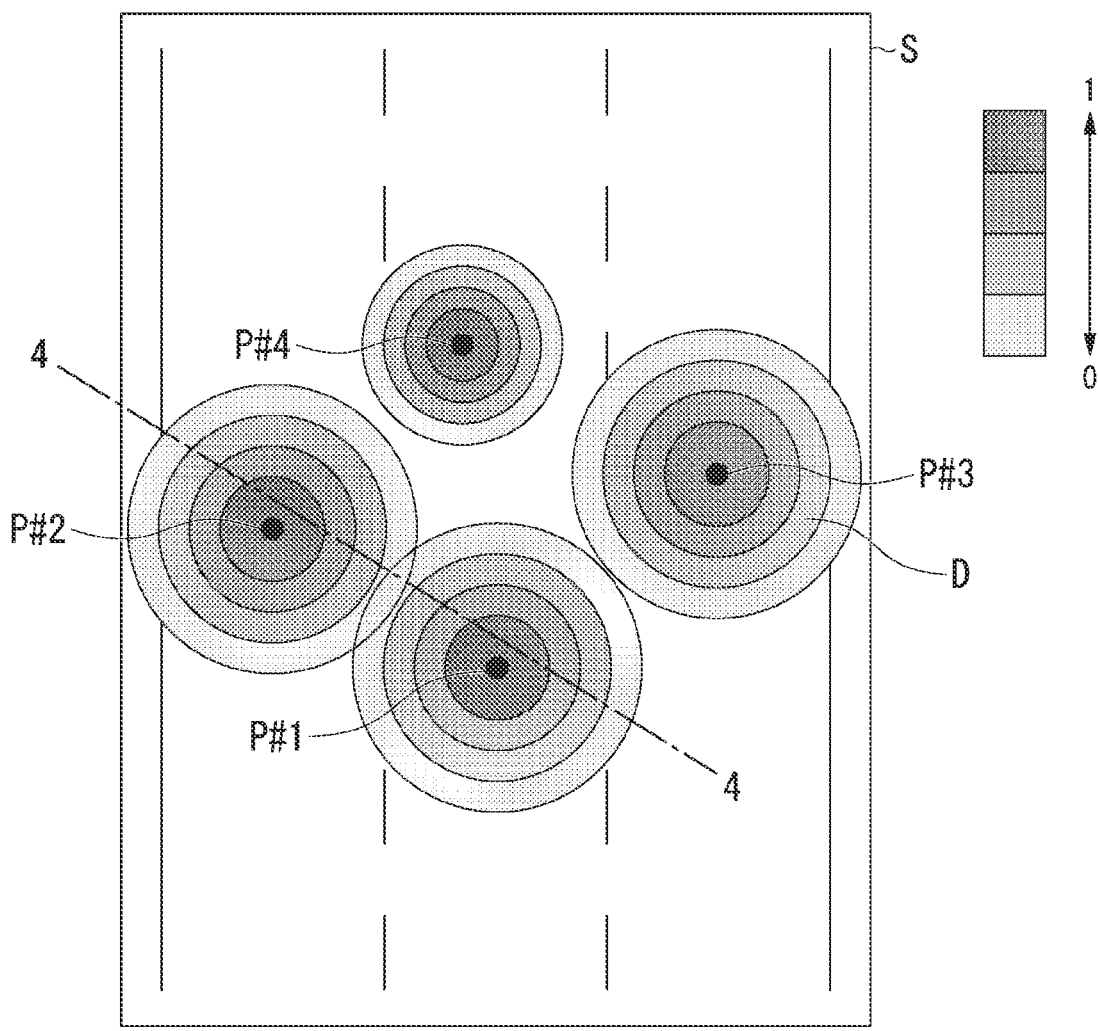
FIG. 3 is a diagram which schematically shows density distribution.
Figure 4:
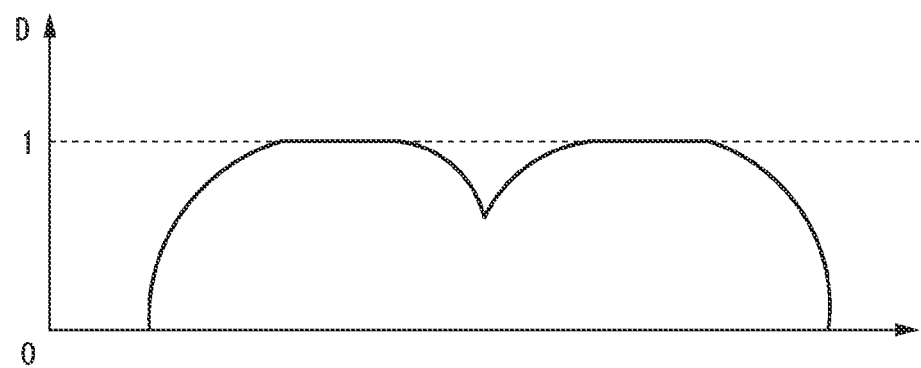
FIG. 4 is a diagram which shows a height of a density value at line 4-4 in FIG. 3.

Then, the density distribution information generator 130 generates information on the density distribution by superimposing index values I obtained for the plurality of vehicles (adding respective coordinates on the virtual plane S). In the following description, a value obtained by adding the index values for the plurality of vehicles is referred to as a density value D. The index value I and the density value D may be set with a minimal required value as an upper limit (for example, 1). In that case, when a result of adding the index values I obtained for the plurality of vehicles exceeds the minimal required value, the density distribution information generator 130 sets the minimal required value at that point as the density value D. FIG. 3 is a diagram which schematically shows the density distribution. FIG. 4 is a diagram which shows a height of the density value D in line 4-4 in FIG. 3.

The communicator 140 is, for example, a wireless communication device using a method such as Bluetooth (a registered trademark) or Wi-Fi. The communicator 140 communicates with a communicator 210 of the in-vehicle device 200, and transmits the information on the density distribution to the communicator 210. The communicator 140 may also be capable of communicating using a cellular network. The communicator 140 accesses the Internet using Wi-Fi or a cellular network, and downloads the application program 152. The storage 150 is, for example, a flash memory. The storage 150 stores the application program 152 and also functions as a working memory for each functional unit.

The in-vehicle device 200 includes, for example, a communicator 210, a predictor 220, an output controller 230, an outputter 240, and a storage 250.

The communicator 210 may communicate with the communicator 140 of the terminal device 100 and may also be able to access the Internet using Wi-Fi or a cellular network. The communicator 210 passes the information on the density distribution received from the communicator 140 of the terminal device 100 to the predictor 220.

Each of the predictor 220 and the output controller 230 functions, for example, when a program 252 stored in the storage 250 is executed by a processor such as a CPU. Some or all of these components may be realized by hardware (a circuit unit; including circuitry) such as large-scale integration (LSI), an application specific integrated circuit (ASIC), a field-programmable gate array (FPGA), or a graphics processing unit (GPU), and may also be realized by software and hardware in cooperation. The storage 250 is, for example, a hard disk drive (HDD), a flash memory, a random-access memory (RAM), or the like.

The predictor 220 predicts whether a target vehicle will enter between two vehicles based on a temporal change of the density value D indicated by the information on the density distribution. The target vehicle is a small vehicle such as a two-wheeled vehicle that may slip between vehicles, a robot, or the like. The predictor 220 may predict whether the target vehicle will enter between the two vehicles further based on a comparison with a plurality of reference values. In addition, the predictor 220 may also predict whether the target vehicle will enter between the two vehicles further based on a distance between the two vehicles.

Figure 5:
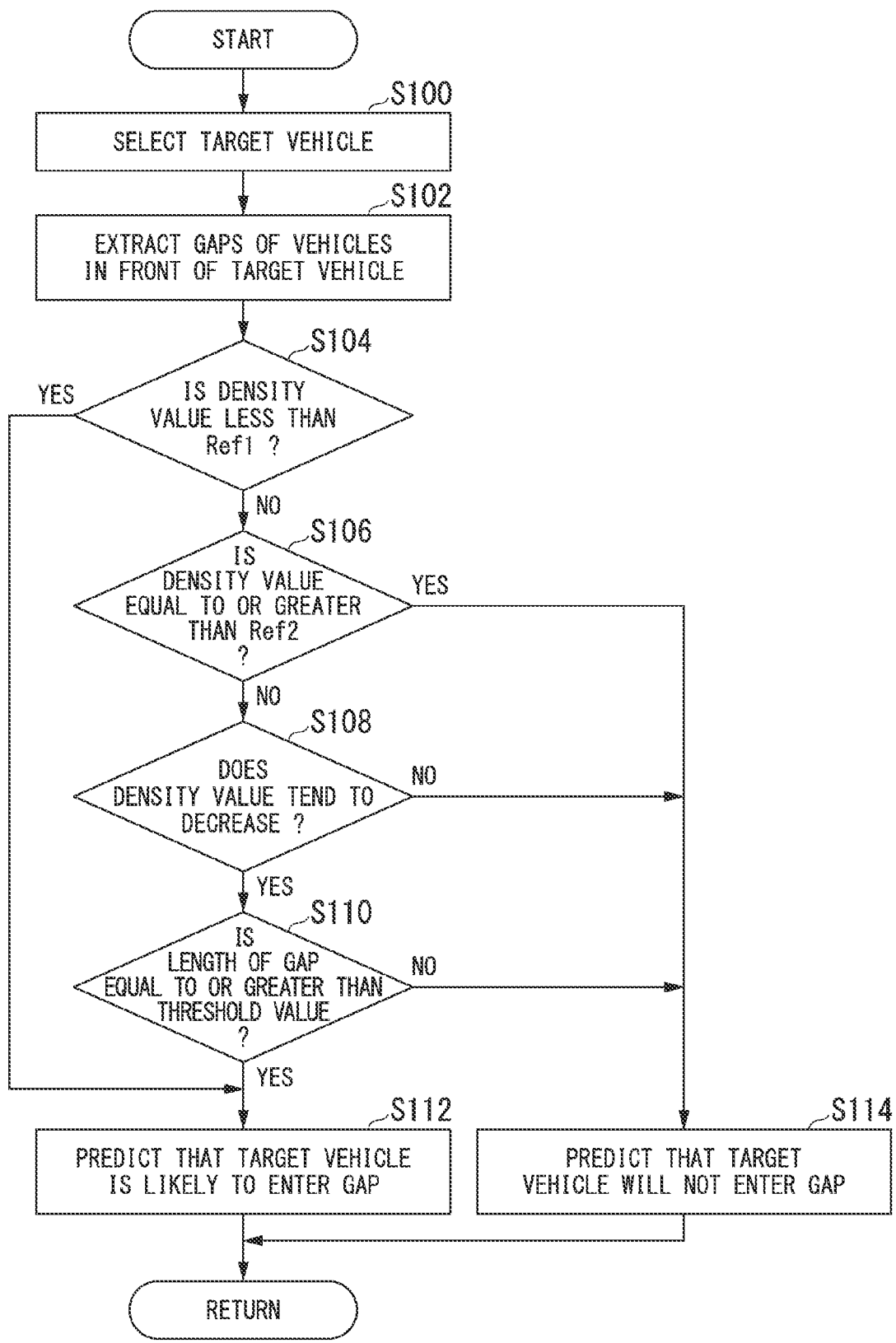
FIG. 5 is a flowchart which shows an example of a flow of processing executed by a predictor.

FIG. 5 is a flowchart which shows an example of a flow of processing executed by the predictor 220. First, the predictor 220 selects the target vehicle (step S100) and extracts gaps between vehicles in front of the target vehicle (step S102).

Figure 6:
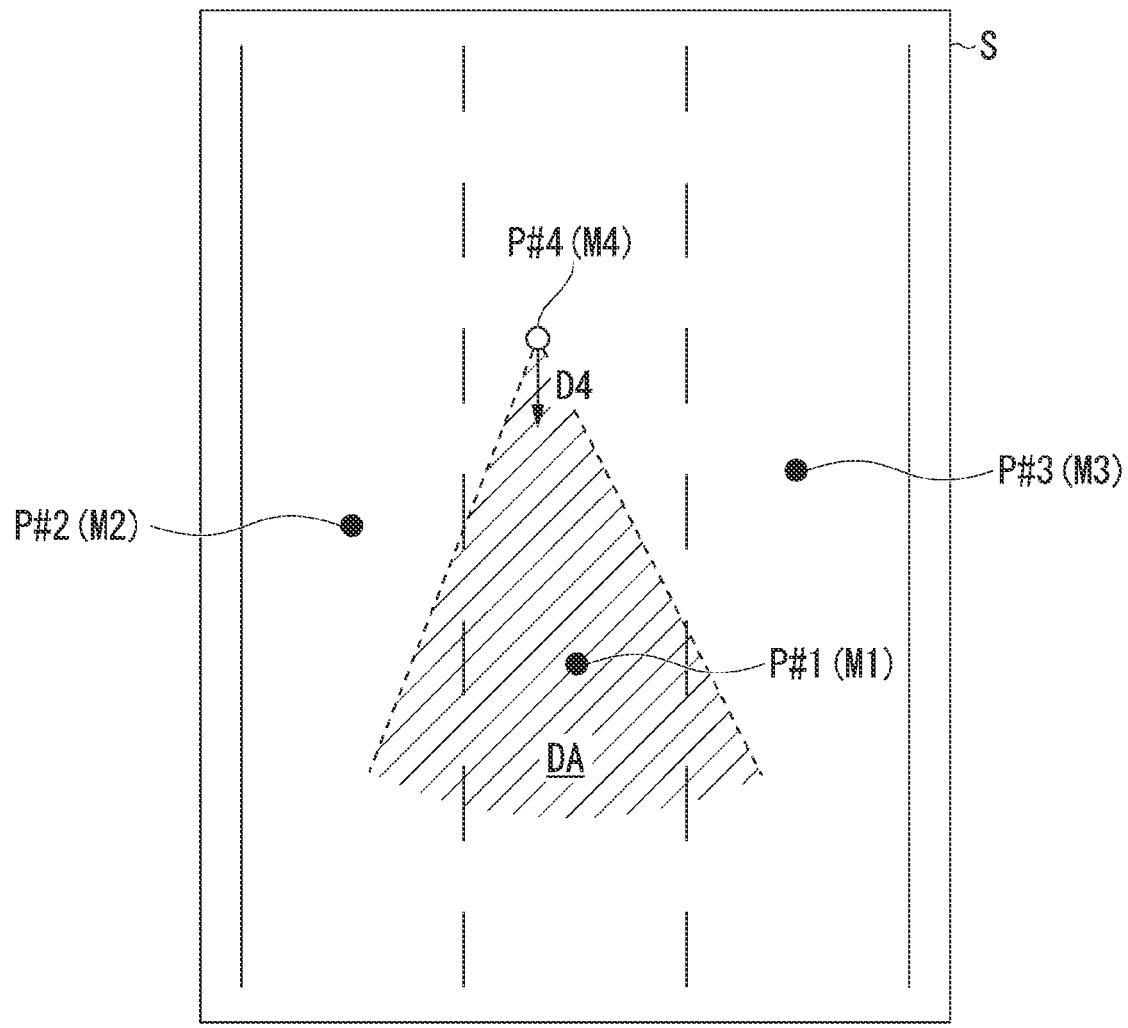
FIG. 6 is a diagram for describing processing of extracting a gap between vehicles in front of a target vehicle.

FIG. 6 is a diagram for describing processing of extracting the gaps of the vehicles in front of the target vehicle. The target vehicle is a vehicle M4, and the position thereof is represented by P #4. For example, the predictor 220 has a search range DA of about 30 degrees to the left to right, centered on a traveling direction D4 of the target vehicle M4, and first extracts gaps between vehicles (vehicles adjacent to each other in a left to right direction when viewed from the target vehicle M4) as gap candidates. In the example of FIG. 6, a gap between a vehicle M1 and a vehicle M2 and a gap between the vehicle M1 and a vehicle M3 are extracted as gap candidates. Furthermore, the predictor 220 derives, for example, a midpoint of each of the gap candidates, and extracts a gap candidate whose azimuthal angle of the midpoint viewed from the target vehicle M4 is closest to the traveling direction D4 as a gap to be predicted. In the example of FIG. 6, the gap between the vehicle M1 and the vehicle M2 is extracted.

Next, the predictor 220 obtains a representative value of density values in the extracted gap. The representative value of density values may be a density value at the midpoint of the gap, or may be a statistical value such as an average value of the density values in the gap. In the following description, this representative value is referred to as a density value. The predictor 220 determines whether the density value is less than a first reference value Ref1 (step S104). The first reference value Ref1 is an upper limit value in a range of low-density values including zero. If the density value is less than the first reference value Ref1, the predictor 220 predicts that the target vehicle is likely to enter the gap (step S112).

When it is determined that the density value is equal to or greater than the first reference value Ref1, the predictor 220 determines whether the density value is equal to or greater than a second reference value Ref2 (step S106). The second reference value Ref2 is a lower limit value in a range of high-density values including the minimal required value (upper limit value) described above. The first reference value Ref1 is smaller than the second reference value Ref2. When it is determined that the density value is equal to or greater than the second reference value Ref2, the predictor 220 predicts that the target vehicle will not enter the gap (step S114).

When it is determined that the density value is less than the second reference value Ref2, the predictor 220 determines whether the density value tends to decrease (step S108). The predictor 220 compares a density value in a current control cycle with a density value in a previous control cycle, and determines that the density value tends to decrease when the density value in a current control cycle has decreased by more than a threshold value. The predictor 220 may compare the density value in the current control cycle with an average value of density values in control cycles before the previous time, and determine that the density value tends to decrease when the density value in the current control cycle has decreased by more than a threshold value, and may compare the density value in the current control cycle with a density value in a control cycle a predetermined number of cycles before, and determine that the density value tends to decrease when the density value in the current control cycle has decreased by more than a threshold value. When it is determined that the density value does not tend to decrease, the predictor 220 predicts that the target vehicle will not enter the gap (step S114).

When it is determined that the density value tends to decrease, the predictor 220 determines whether a length (distance) of a gap is equal to or greater than a threshold value (step S110). When it is determined that the length (distance) of the gap is equal to or greater than the threshold value, the predictor 220 predicts that the target vehicle is likely to enter the gap (step S112). On the other hand, when it is determined that the length (distance) of the gap is less than the threshold value, the predictor 220 predicts that the target vehicle will not enter the gap (step S114). This threshold is set to a length that allows a two-wheeled vehicle to pass through with a margin. The predictor 220 may perform prediction using the threshold value which is a fixed value, or may change the threshold value based on vehicle types of vehicles on both sides of the gap. For example, when any of the vehicles on both sides of the gap is a large vehicle, the threshold may be changed to be larger.

Figure 7:
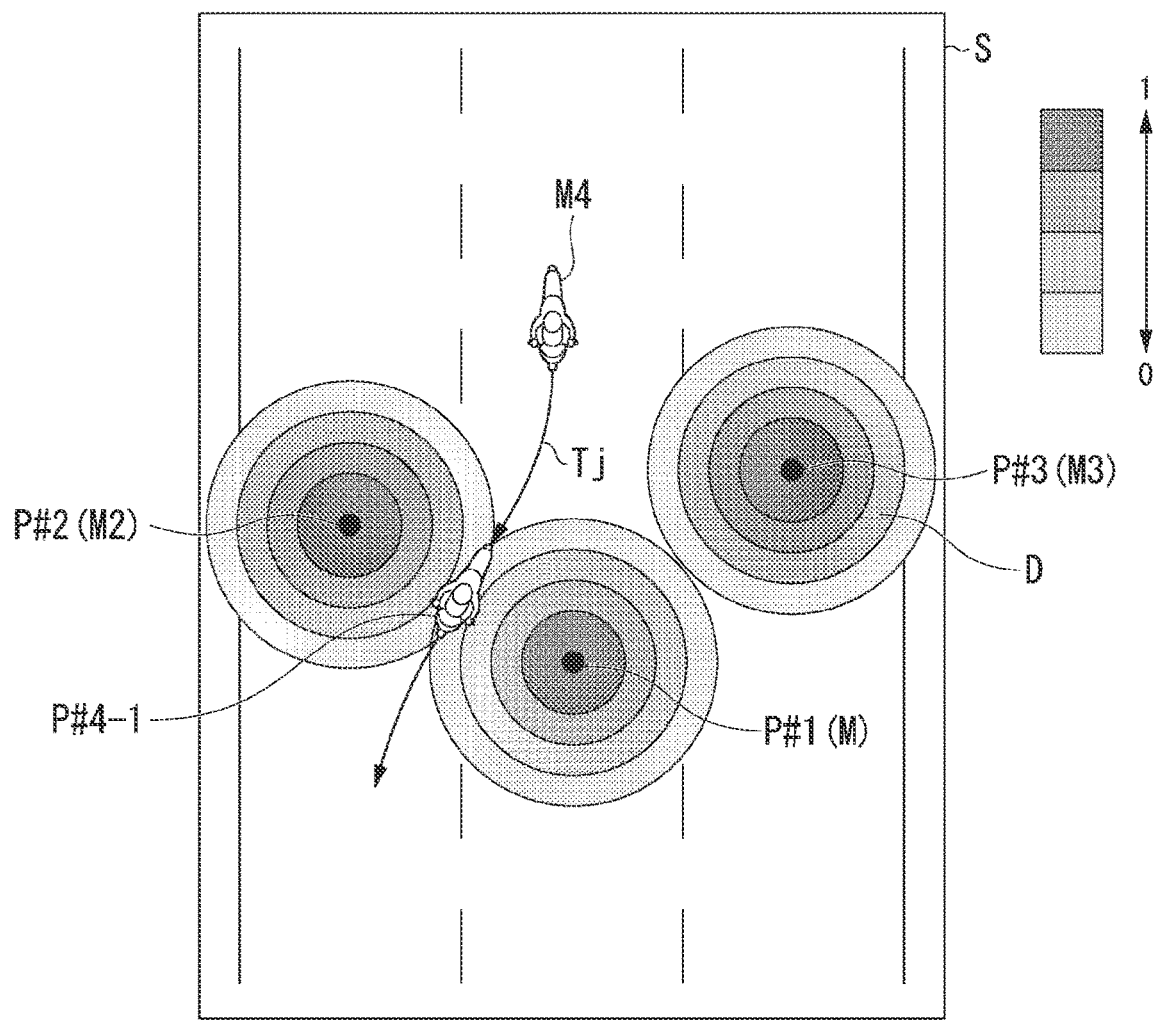
FIG. 7 is a diagram for describing processing of estimating a trajectory and acceleration of a target vehicle.

Furthermore, the predictor 220 may estimate the trajectory and acceleration at a time when the target vehicle passes through the gap, based on a gradient of the density value. FIG. 7 is a diagram for describing processing of estimating the trajectory and acceleration of the target vehicle. As shown in FIG. 7, the predictor 220 estimates that the target vehicle M4 will travel along a trajectory Tj which is a series of points where the density value D is small (a valley of density distribution). The predictor 220 predicts that the acceleration of the target vehicle M4 will be small (including negative acceleration, that is, deceleration) in a section where the density value D rises between points along the trajectory Tj (a section up to a point P #4-1 in FIG. 7), predicts that the acceleration of the target vehicle M4 will be large in a section where the density value D decreases between points (a section after the point P #4-1 in FIG. 7), and generates a future speed profile of the target vehicle M4 based on these predictions. At this time, the predictor 220 may predict that the acceleration will be smaller when a rising speed of the density value D between the points is large (the gradient in a positive direction is large) than when the rising speed is small, and may predict that the acceleration will be larger when a decreasing speed of the density value D between the points is large (the gradient in a negative direction is large) than when a decreasing speed is small. Since it is assumed that the target vehicle will accelerate significantly in a situation where a field of view of the target vehicle suddenly opens, the predictor 220 can predict a behavior of the target vehicle more accurately in such a situation.

The output controller 230 controls the outputter 240 based on a prediction result of the predictor 220. The outputter 240 is, for example, an output device such as a speaker or a display device. When the predictor 220 predicts that the target vehicle is likely to enter the gap, the output controller 230 causes the outputter 240 to output information that calls attention to that effect using a voice or an image. When the predictor 220 predicts the trajectory and acceleration of the target vehicle, the information may be output to the outputter 240 when a degree of proximity of the target vehicle to the host vehicle meets a reference (for example, time to collision (TTC) is less than the threshold value). The outputter 240 may be a communication interface that communicates with a vehicle control device such as an automatic driving control device or an emergency stop control device, and in this case, the output controller 230 transmits information indicating that the target vehicle is likely to enter the gap to the vehicle control device using the outputter 240.

According to the first embodiment described above, it is possible to accurately predict whether the target vehicle will enter between vehicles by including the acquirer (120) that acquires the position of a vehicle based on information from the detection device (110) for detecting the position of the vehicle, the generator (130) that generates information on a density distribution in which index values (I) having a distribution according to the position of a vehicle are superimposed on one another for a plurality of vehicles, and the predictor (220) that predicts whether the target vehicle will enter a gap between two vehicles based on a temporal change of the density value (D) indicated by the information of density distribution.

Second Embodiment

Figure 8:
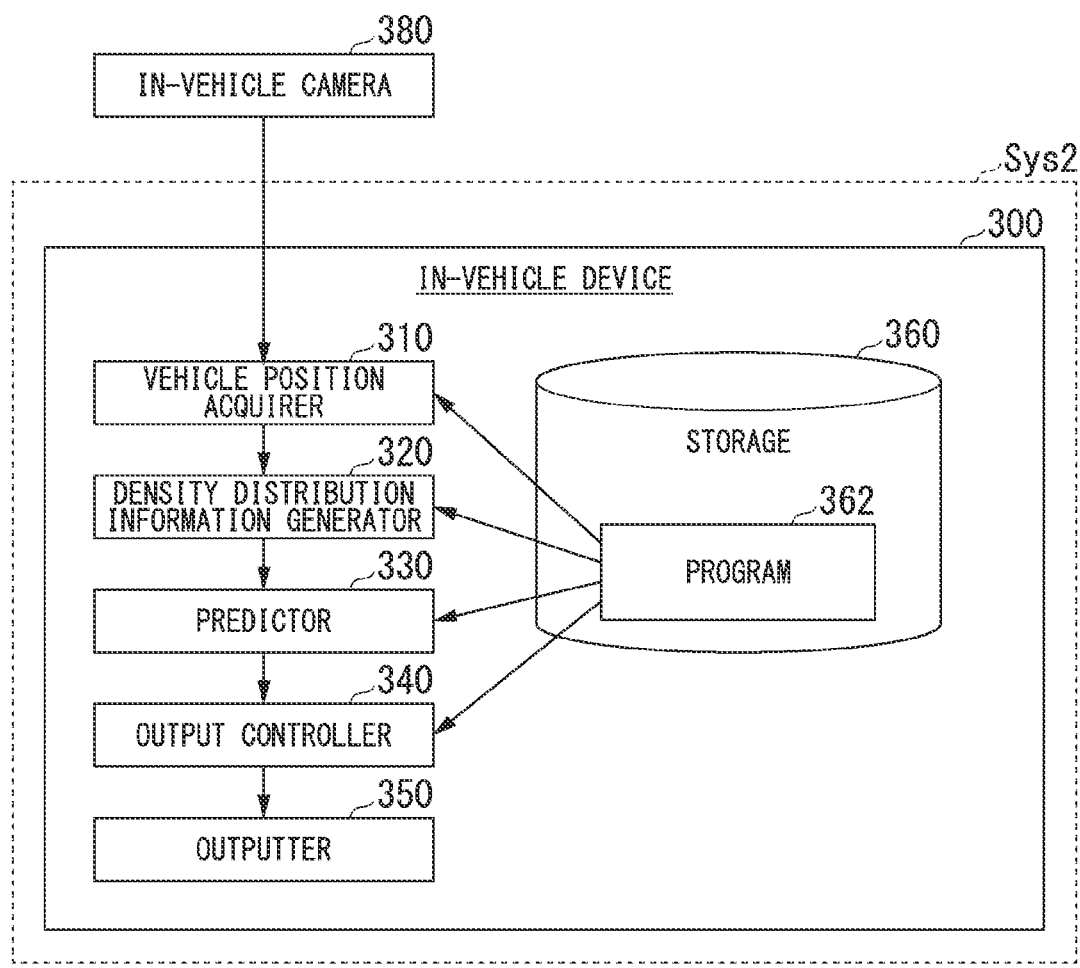
FIG. 8 is a diagram which shows an application example of a traffic monitoring system according to a second embodiment.

Hereinafter, a second embodiment will be described. The second embodiment is a form in which components of the traffic monitoring system are exclusively mounted on an in-vehicle device. FIG. 8 is a diagram which shows an application example of a traffic monitoring system Sys2 according to the second embodiment. The traffic monitoring system Sys2 includes, for example, an in-vehicle device 300.

The in-vehicle device 300 includes, for example, a vehicle position acquirer 310, a density distribution information generator 320, a predictor 330, an output controller 340, an outputter 350, and a storage 360. Each of the vehicle position acquirer 310, the density distribution information generator 320, the predictor 330, and the output controller 340 functions, for example, when a program 362 stored in the storage 360 is executed by a processor such as a CPU. Some or all of these components may be realized by hardware such as LSI, ASIC, FPGA, or GPU, and may also be realized by software and hardware in cooperation. The storage 360 is, for example, an HDD, a flash memory, a RAM, or the like.

The in-vehicle camera 380 is a camera attached to a vehicle (the host vehicle) in which the in-vehicle device 300 is mounted. The in-vehicle camera 380 captures an image of scenery outside the vehicle in response to a request from the in-vehicle device 300. The in-vehicle camera 380 is attached to any position where an image of the space in front of or behind the host vehicle can be captured to capture an image of the scenery outside the vehicle via the front windshield or the rear windshield, or is provided such that the lens is exposed outside of the vehicle to directly capture the image of the scenery outside the vehicle.

The vehicle position acquirer 310 acquires the position of a vehicle based on the information from the camera 110. Subsequent processing is the same as that of the vehicle position acquirer 120 in the first embodiment. The functions of the density distribution information generator 320, the predictor 330, the output controller 340, and the outputter 350 are the same as the functions of the density distribution information generator 130, the predictor 220, the output controller 230, and the outputter 240 in the first embodiment. With such a configuration, the same effect as that of the first embodiment can be obtained.

According to the second embodiment described above, it is possible to accurately predict whether the target vehicle will enter between vehicles by including the acquirer (310) that acquires the position of a vehicle based on the information from the detection device (380) for detecting the position of the vehicle, the generator (320) that generates the information of density distribution in which the index values (I) having a distribution according to the position of a vehicle are superimposed on one another for a plurality of vehicles, and the predictor (330) that predicts whether the target vehicle will enter a gap between two vehicles based on the temporal change of the density value (D) indicated by the information on a density distribution.

Third Embodiment

Figure 9:
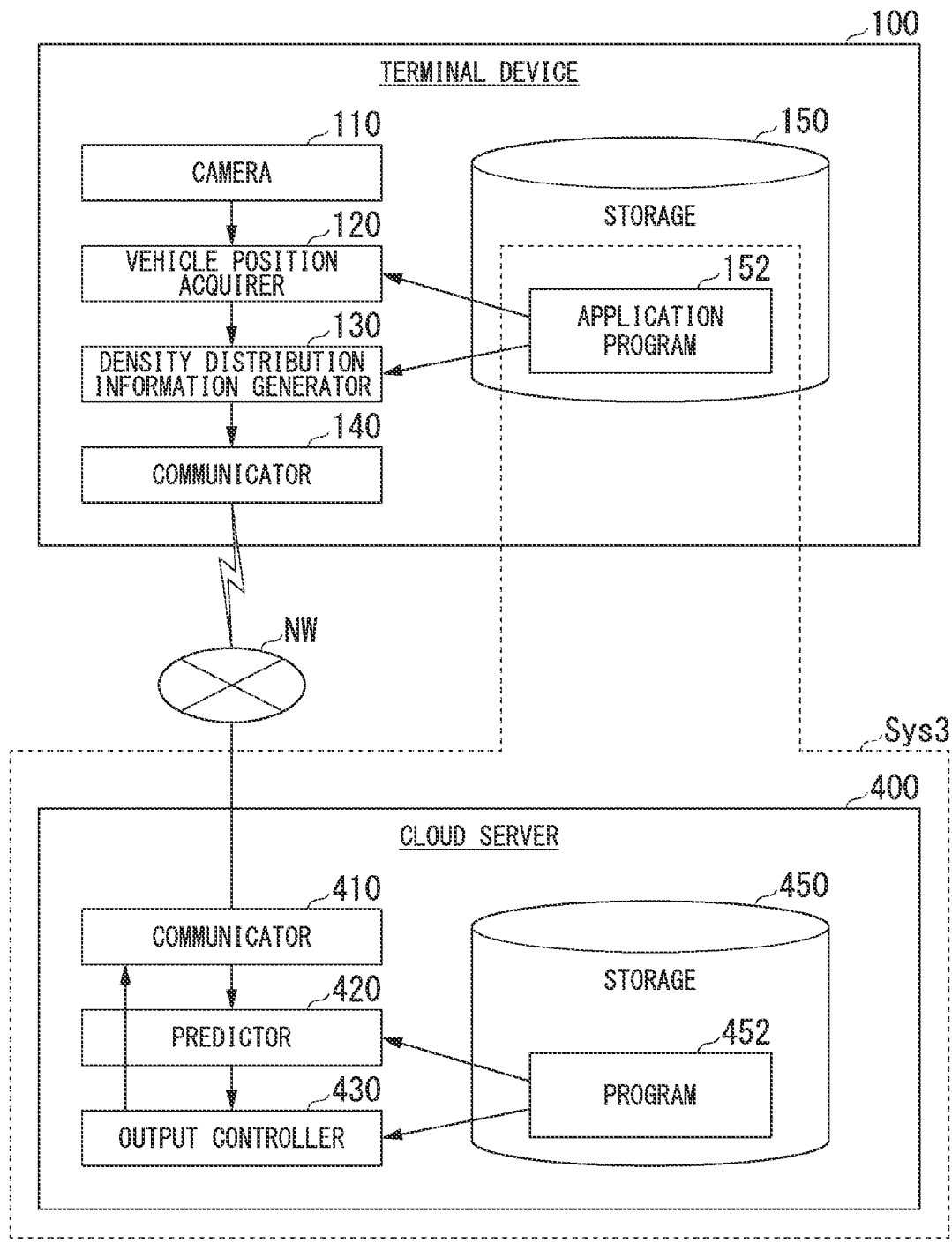
FIG. 9 is a diagram which shows an application example of a traffic monitoring system according to a third embodiment.

Hereinafter, a third embodiment will be described. The third embodiment is a form in which the components of the traffic monitoring system are provided to be distributed to an application program of a terminal device and a cloud server. FIG. 9 is a diagram which shows an application example of a traffic monitoring system Sys3 according to the third embodiment. The traffic monitoring system Sys3 includes, for example, an application program 152 installed in the terminal device 100 and a cloud server 400. In the third embodiment, since a communication partner of the communicator 140 is different from that of the first embodiment as a constituent of the terminal device 100, the same reference numerals as in the first embodiment will be given to the terminal device 100, and duplicate description thereof will be omitted.

The communicator 140 accesses a network NW using, for example, a cellular network or a Wi-Fi network, and communicates with the communicator 410 of the cloud server 400. The network NW includes the Internet, public lines, provider devices, and the like.

The cloud server 400 includes, for example, a communicator 410, a predictor 420, an output controller 430, and a storage 450. Each of the predictor 420 and the output controller 430 functions, for example, when the program 452 stored in the storage 450 is executed by a processor such as a CPU. Some or all of these components may be realized by hardware such as LSI, ASIC, FPGA, or GPU, and may also be realized by software and hardware in cooperation. The storage 360 is, for example, an HDD, a flash memory, a RAM, or the like.

The communicator 410 is, for example, a communication interface such as a network card for connecting to the network NW. The communicator 410 passes the information on a density distribution received from the communicator 140 of the terminal device 100 to the predictor 420.

A function of the predictor 420 is the same as that of the predictor 220 in the first embodiment. The output controller 430 transmits information based on a prediction result of the predictor 420 to the terminal device 100 using the communicator 410. The terminal device 100 has a function corresponding to the outputter 240 of the first embodiment, and, when it is predicted that the target vehicle is likely to enter a gap, performs processing of outputting information that calls attention to that effect using a voice or an image.

According to the third embodiment described above, it is possible to accurately predict whether the target vehicle will enter between vehicles by including the acquirer (120) that acquires the position of a vehicle based on the information from the detection device (110) for detecting the position of the vehicle, the generator (130) that generates information on a density distribution in which the index values (I) having a distribution according to the position of a vehicle are superimposed on one another for a plurality of vehicles, and the predictor (420) that predicts whether the target vehicle will enter a gap between two vehicles based on a temporal change of the density value (D) indicated by the information on a density distribution.

Fourth Embodiment

Hereinafter, a fourth embodiment will be described. In the fourth embodiment, the predictor 220 predicts whether the target vehicle will enter between two vehicles further based on relative speeds of the two vehicles with respect to the target vehicle. More specifically, the predictor 220 predicts that the target vehicle is likely to enter between the two vehicles when the relative speeds of the two vehicles with respect to the target vehicle are increasing, even when the density value tends to decrease. This is because, for example, when the target vehicle is following two vehicles, it tends to travel to reduce the increased relative speed (that is, an increase in the distance between the front and rear vehicles). The predictor 220 can obtain the relative speeds of the two vehicles with respect to the target vehicle based on, for example, positional information of each vehicle acquired from the camera 110. Other functions of the predictor 220 and other components of the traffic monitoring system are the same as those of the embodiments described above.

Figure 10:
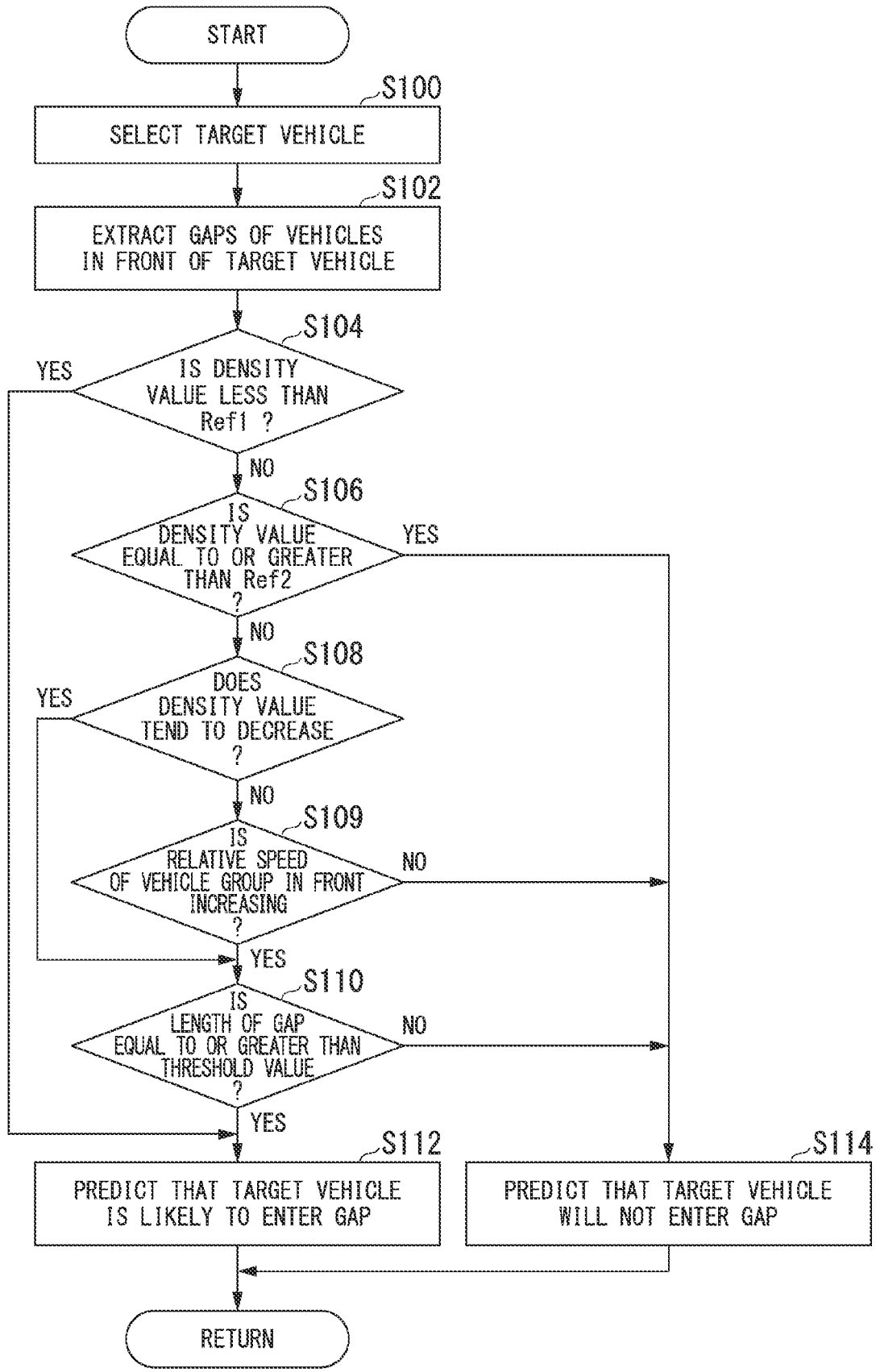
FIG. 10 is a flowchart which shows an example of a flow of processing executed by a predictor according to a fourth embodiment.

FIG. 10 is a flowchart which shows an example of a flow of processing executed by the predictor 220 according to the fourth embodiment. Since processing up to step S106 is the same as the processing of the flowchart shown in FIG. 4, the description thereof will be omitted. When it is determined in step S108 that the density value does not tend to decrease, the predictor 220 determines whether the relative speeds of the two vehicles with respect to the target vehicle are increasing (step S109). When it is determined that the relative speeds of the two vehicles with respect to the target vehicle are increasing, the predictor 220 determines whether a length (distance) of the gap is equal to or greater than a threshold value (step S110). When it is determined that the length (distance) of the gap is equal to or greater than the threshold value, the predictor 220 predicts that the target vehicle is likely to enter the gap (step S112). On the other hand, when it is determined that the relative speeds of the two vehicles with respect to the target vehicle are not increasing, the predictor 220 predicts that the target vehicle will not enter the gap (step S114). As a result, processing of this flowchart ends.

In the flowchart described above, when it is determined that the relative speeds of the two vehicles with respect to the target vehicle are increasing, the predictor 220 then determines whether a gap length (distance) is equal to or greater than a threshold value. However, the present invention is not limited to such a configuration, and the predictor 220 may also predict that the target vehicle is likely to enter the gap when it is determined that the relative speeds of the two vehicles with respect to the target vehicle are increasing.

According to the fourth embodiment described above, the predictor 220 predicts whether the target vehicle will enter between the two vehicles based on the relative speeds of the two vehicles with respect to the target vehicle, and thereby the accuracy of prediction can be improved.

Fifth Embodiment

Hereinafter, a fifth embodiment will be described. In the fifth embodiment, the predictor 220 predicts whether the target vehicle will accelerate toward a space between two vehicles based on a temporal change of the density value D indicated by the information on a density distribution. At this time, the predictor 220 predicts whether the target vehicle will accelerate toward the space between the two vehicles further based on the relative speeds of the two vehicles with respect to the target vehicle in the same manner as in the fourth embodiment. Other functions of the predictor 220 and other components of the traffic monitoring system are the same as those of the embodiments described above.

Figure 11:
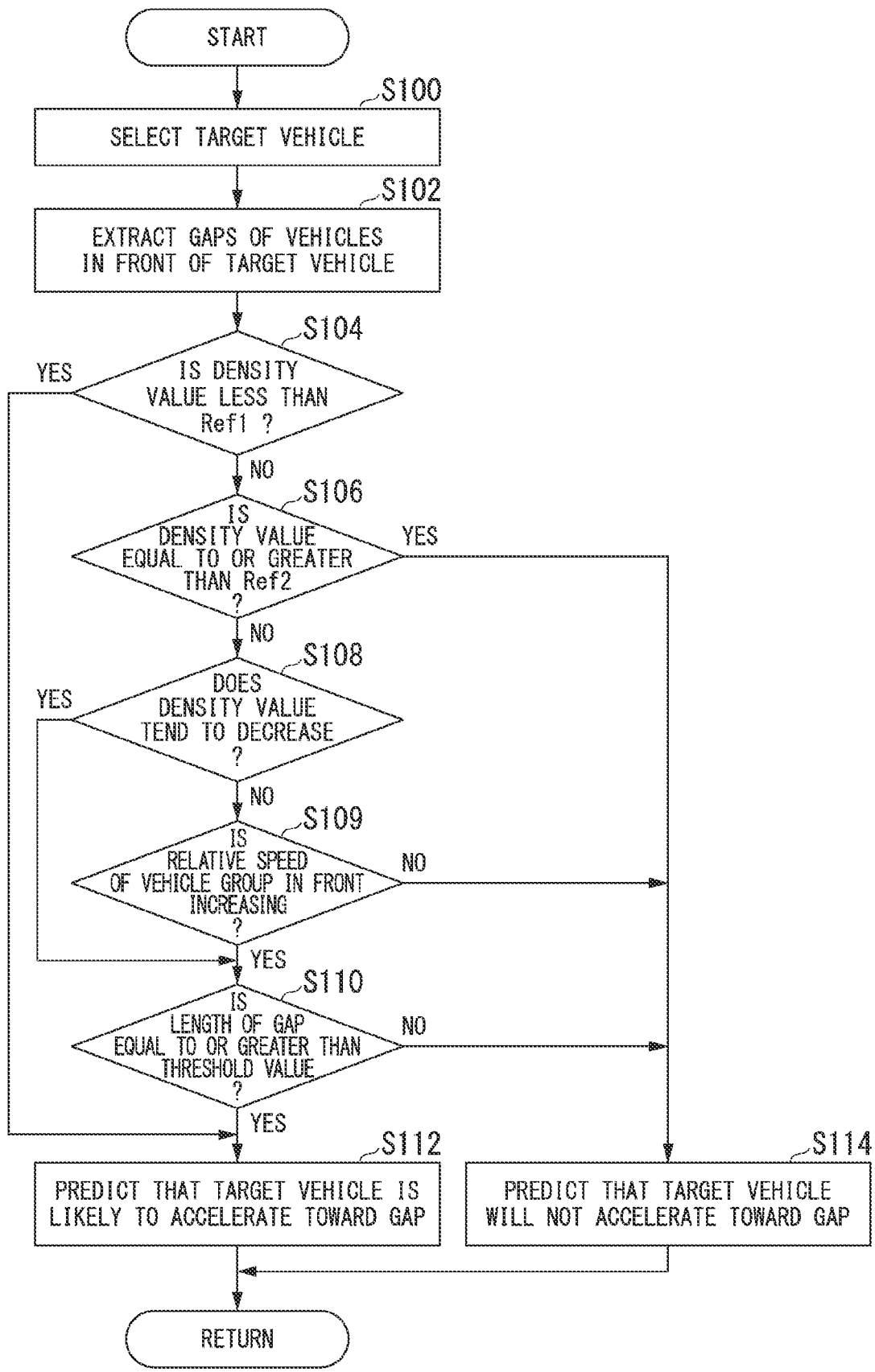
FIG. 11 is a flowchart which shows an example of a flow of processing executed by a predictor according to a fifth embodiment.

FIG. 11 is a flowchart which shows an example of a flow of processing executed by the predictor 220 according to a fifth embodiment. Since processing up to step S110 is the same as the processing of the flowchart shown in FIG. 10, the description thereof will be omitted. When it is determined in step S110 that a length (distance) of a gap is equal to or greater than a threshold value, the predictor 220 predicts that the target vehicle is likely to accelerate toward the gap (step S112). On the other hand, when it is determined that the relative speeds of the two vehicles with respect to the target vehicle are not increasing in step S109, or when it is determined that the length (distance) of the gap is not equal to or greater than the threshold value in step S110, the predictor 220 predicts that the target vehicle will not accelerate towards the gap (step S114).

In the flowchart described above, when it is determined that the relative speeds of the two vehicles with respect to the target vehicle are increasing, the predictor 220 then determines whether the gap length (distance) is equal to or greater than the threshold value. However, the present invention is not limited to such a configuration, and, when it is determined that the relative speeds of the two vehicles with respect to the target vehicle are increasing, the predictor 220 may predict that the target vehicle is likely to accelerate toward the gap.

According to the fifth embodiment described above, it is possible to predict whether the target vehicle will accelerate toward the gap.

In each of the embodiments described above, it is assumed that the detection device is provided in the terminal device or the vehicle, but the detection device may be a camera, a radar device, an LIDAR device, or the like provided on a roadside. In this case, information obtained by the detection device may be transmitted to any one of the terminal device, the in-vehicle device, and the cloud server by communication.

In each of the embodiments described above, the flow of processing may be changed as follows.

(A-1) First, in the processing of step S102 shown in FIG. 5, the predictor 220 extracts all the gaps between vehicles within the search range DA (between vehicles adjacent to each other in the left to right direction when viewed from the target vehicle M4), and sets them as gap candidates.

(B-1) Next, the predictor 220 determines ranking of gap candidates in an order in which the azimuth angle of the midpoint viewed from the target vehicle M4 is closer to the traveling direction D4 (not shown).

(C-1) Next, the predictor 220 performs the processing of steps S104 to S114 in order from a gap candidate with a higher rank (the azimuth angle of the midpoint is closer to the traveling direction D4), and performs sequential processing such as determining that, when processing has advanced to step S112 for a gap candidate with the highest rank, the target vehicle M4 will enter the gap candidate, and determining that, otherwise, when the processing has advanced to step S112 for a gap candidate with a second highest rank, the target vehicle M4 will enter the gap candidate. Then, when the processing has advanced to step S114 for all the gap candidates, it is predicted that the target vehicle M4 will not enter any of the gap candidates.

The order of processing may be arbitrarily changed as long as the processing and the result do not change.

In each of the embodiments described above, the flow of processing may be changed as follows.

(A-2) First, in the processing of step S102 shown in FIG. 5, the predictor 220 extracts all the gaps between vehicles within the search range DA (between vehicles adjacent to each other in the left to right direction when viewed from the target vehicle M4), and sets them as gap candidates.

(B-2) Next, the predictor 220 obtains the density value and the gap length for all the gap candidates, and determines the ranking of the gap candidates in an order in which the score based on one or both of them is better (not shown). This score is higher (better) as the density value is lower and the gap length is longer. The score may be a reciprocal of the density value, or it may be a value proportional to the length of a gap. When a lower score indicates a better value, the score may be a density value or a product of the density value and a coefficient or may be a reciprocal of a size of the gap.

(C-2) When the ranking is determined, the predictor 220 performs processing of steps S104 to S114 in order from a gap candidate with higher rank (higher score), and performs sequential processing such as determining that, when the processing has advanced to step S112 for a gap candidate with the highest rank, the target vehicle M4 will enter the gap candidate, and determining that, otherwise, when the processing has advanced to step S112 for a gap candidate with a second highest rank, the target vehicle M4 will enter the gap candidate. Then, when the processing has advanced to step S114 for all the gap candidates, it is predicted that the target vehicle M4 will not enter any of the gap candidates. The order of processing may be arbitrarily changed as long as the processing and the result do not change.

Although a form for implementing the present invention has been described above using the embodiments, the present invention is not limited to these embodiments, and various modifications and substitutions can be added within a range not departing from the gist of the present invention.

What is claimed is:

1. A traffic monitoring system comprising:
a storage device that stores a program; and
a hardware processor,
wherein the hardware processor executes the program stored in the storage device, thereby:
acquiring a position of a mobile object based on information from a detection device for detecting the position of the mobile object;
generating information on a density distribution in which index values having a distribution according to the position of the mobile object are superimposed on one another for a plurality of mobile objects;
predicting whether a target mobile object is likely to enter a gap between two of the mobile objects based on a temporal change in density value indicated by the information on a density distribution; and
estimating a trajectory and acceleration at a time when the target mobile object passes through the gap based on a gradient of the density value.

2. The traffic monitoring system according to claim 1, wherein the target mobile object is a two-wheeled vehicle.

3. The traffic monitoring system according to claim 1, wherein the hardware processor generates the information on a density distribution on a virtual plane in a bird's-eye view.

4. The traffic monitoring system according to claim 1, wherein, when a density value of a gap between two of the mobile objects is equal to or more than a first reference value and the density value tends to decrease, the hardware processor predicts that the target mobile object is likely to enter the gap.

5. The traffic monitoring system according to claim 1, wherein, when a density value of a gap between two of the mobile objects is equal to or more than a first reference value, the density value does not tend to decrease, and relative speeds of two of the mobile objects with respect to the target mobile object increase, the hardware processor predicts that the target mobile object is likely to enter the gap.

6. The traffic monitoring system according to claim 1, wherein, when a length of a gap between two of the mobile objects is less than a threshold value, the hardware processor predicts that the target mobile object is not likely to enter the gap.

7. The traffic monitoring system according to claim 1, wherein, when there are a plurality of gap candidates within a search range on a traveling direction side of the target mobile object, the hardware processor derives a midpoint of each of the gap candidates, and extracts, as a gap to be predicted, a gap candidate whose azimuthal angle of the midpoint viewed from the target mobile object is closest to a traveling direction of the target mobile object.

8. The traffic monitoring system according to claim 1, wherein, when there are a plurality of gap candidates within a search range on a traveling direction side of the target mobile object, the hardware processor predicts whether the target mobile object is likely to enter a gap in order from a gap candidate with a better score based on the density value.

9. The traffic monitoring system according to claim 1, wherein, when there are a plurality of gap candidates within a search range on a traveling direction side of the target mobile object, the hardware processor predicts whether the target mobile object is likely to enter a gap in order from a gap candidate with a better score based on a length of the gap.

10. A traffic monitoring method to be executed by a computer, comprising:
acquiring a position of a mobile object based on information from a detection device for detecting the position of the mobile object;
generating information on a density distribution in which index values having a distribution according to the position of the mobile object are superimposed on one another for a plurality of mobile objects;
predicting whether a target mobile object is likely to enter a gap between two of the mobile objects based on a temporal change of a density value indicated by the information on a density distribution; and
estimating a trajectory and acceleration at a time when the target mobile object passes through the gap based on a gradient of the density value.

11. A traffic monitoring system comprising:
a storage device that stores a program; and
a hardware processor,
wherein the hardware processor executes the program stored in the storage device, thereby:

acquiring a position of a mobile object based on information from a detection device for detecting the position of the mobile object;

generating information on a density distribution in which index values having a distribution according to the position of the mobile object are superimposed on one another for a plurality of mobile objects; and predicting whether a target mobile object is likely to enter a gap between two of the mobile objects based on a temporal change in density value indicated by the information on a density distribution, wherein, when there are a plurality of gap candidates within a search range on a traveling direction side of the target mobile object, the hardware processor predicts whether the target mobile object is likely to enter a gap in order from a gap candidate with a better score based on the density value.

12. A traffic monitoring system comprising:
a storage device that stores a program; and
a hardware processor, wherein the hardware processor executes the program stored in the storage device, thereby:

acquiring a position of a mobile object based on information from a detection device for detecting the position of the mobile object;

generating information on a density distribution in which index values having a distribution according to the position of the mobile object are superimposed on one another for a plurality of mobile objects; and predicting whether a target mobile object is likely to enter a gap between two of the mobile objects based on a temporal change in density value indicated by the information on a density distribution, wherein, when there are a plurality of gap candidates within a search range on a traveling direction side of the target mobile object, the hardware processor predicts whether the target mobile object is likely to enter a gap in order from a gap candidate with a better score based on a length of the gap.

* * * * *